United States Patent
Tomlin et al.

(10) Patent No.: US 7,752,412 B2
(45) Date of Patent: *Jul. 6, 2010

(54) METHODS OF MANAGING FILE ALLOCATION TABLE INFORMATION

(75) Inventors: Andrew Tomlin, San Jose, CA (US); Sergey Anatolievich Gorobets, Edinburgh (GB)

(73) Assignee: Sandisk Corporation, Milpitas, CA (US)

( * ) Notice: Subject to any disclaimer, the term of this patent is extended or adjusted under 35 U.S.C. 154(b) by 637 days.

This patent is subject to a terminal disclaimer.

(21) Appl. No.: 11/537,243

(22) Filed: Sep. 29, 2006

(65) Prior Publication Data

US 2008/0082774 A1 Apr. 3, 2008

(51) Int. Cl.
*G06F 13/00* (2006.01)
(52) U.S. Cl. .................. 711/170; 711/171; 711/172
(58) Field of Classification Search .............. 711/103, 711/170
See application file for complete search history.

(56) References Cited

U.S. PATENT DOCUMENTS

| | | | |
|---|---|---|---|
| 5,835,396 | A | 11/1998 | Zhang |
| 6,034,882 | A | 3/2000 | Johnson et al. |
| 6,138,203 | A | 10/2000 | Inokuchi et al. |
| 6,401,160 | B1 | 6/2002 | See et al. |
| 6,647,471 | B2 | 11/2003 | March et al. |
| 6,851,021 | B2 | 2/2005 | Iyengar et al. |
| 6,857,054 | B2 | 2/2005 | Minne |
| 6,895,490 | B1 | 5/2005 | Moore et al. |
| 6,996,660 | B1 | 2/2006 | Moore et al. |
| 7,003,619 | B1 | 2/2006 | Moore et al. |
| 7,051,251 | B2 | 5/2006 | Moore et al. |
| 7,062,602 | B1 | 6/2006 | Moore et al. |
| 7,418,601 | B2* | 8/2008 | Okamoto ............ 713/193 |
| 7,480,766 | B2 | 1/2009 | Gorobets |
| 2003/0120858 | A1 | 6/2003 | March et al. |
| 2006/0020745 | A1 | 1/2006 | Conley et al. |
| 2006/0047920 | A1* | 3/2006 | Moore et al. ............ 711/154 |
| 2007/0174550 | A1* | 7/2007 | Maeda et al. ............ 711/118 |
| 2008/0082773 | A1 | 4/2008 | Tomlin et al. |

FOREIGN PATENT DOCUMENTS

| WO | WO2005/008499 | 1/2007 |
|---|---|---|
| WO | WO2008/042594 | 4/2008 |

OTHER PUBLICATIONS

WIPO International Search Report and Written Opinion mailed Feb. 25, 2008 in International Application No. PCT/US2007/078830 (13 pages).
USPTO Office Action dated Nov. 26, 2008 in U.S. Appl. No. 11/537,216, 12 pages.
USPTO Final Office Action dated Jun. 10, 2009 in U.S. Appl. No. 11/537,216.
USPTO Advisory Action dated Sep. 8, 2009 in U.S. Appl. No. 11/537,216.
USPTO Notice of Panel Decision from Pre-Appeal Brief Review dated Sep. 22, 2009 in U.S. Appl. No. 11/537,216.
USPTO Notice of Allowance dated Nov. 2, 2009 in U.S. Appl. No. 11/537,216.

* cited by examiner

*Primary Examiner*—Hetul Patel
(74) *Attorney, Agent, or Firm*—Weaver Austin Villeneuve & Sampson LLP (57) ABSTRACT

In a nonvolatile memory system, a host allocates clusters and records allocation information in a File Allocation Table that is stored in the nonvolatile memory. A controller separately allocates certain data and records allocation in a record in a volatile memory. File Allocation Table information provided to the host is modified according to the record in the volatile memory.

15 Claims, 7 Drawing Sheets

METHODS OF MANAGING FILE ALLOCATION TABLE INFORMATION

CROSS-REFERENCE TO RELATED APPLICATION

This application is related to U.S. patent application Ser. No. 11/537,216, filed Sep. 29, 2006, entitled, "Systems for Managing File Allocation Table Information," which application is incorporated in its entirety by reference as if fully set forth herein.

BACKGROUND OF THE INVENTION

This invention relates to nonvolatile memory systems and to methods of operating nonvolatile memory systems.

Modular, portable, non-volatile memory devices are available that can be readily connected to and disconnected from host devices such as digital cameras, digital audio recorders, and personal computers. Traditional memory such as flash cards used in these devices is rewritable, allowing a memory address to be erased and rewritten for system or user purposes. The creation of lower-cost memory technologies that are either one-time programmable (OTP) or few-time programmable (FTP) allow new usage models with host devices that are analogous to film in an analog camera where one can simply take and print pictures while saving the low-cost card as a "negative." Ideally, one would be able to use this low-cost card in a standard flash camera, but the technologies are not necessarily compatible, as portable devices typically use the DOS FAT12/16 file system, which requires system structures to be erasable. Updating the firmware in the device with a file system customized for OTP or FTP memory technology can solve this problem, but this would limit the total available market to new cameras with the software upgrade or else would require users to upgrade their existing cameras with software in the field.

SUMMARY OF THE INVENTION

In one scheme for operating a nonvolatile memory, a host allocates clusters from one end of the address range of the memory and the controller allocates clusters from the other end of the address range. Such allocation by a controller allows the host to send an update to previously written data, even though overwriting or erasing the data is not possible. The allocation by the host is recorded in a File Allocation Table (FAT). The allocation by the controller is not recorded in the FAT, but instead is recorded in volatile memory. When a host requests FAT information, the controller modifies the FAT from the nonvolatile memory according to the record in volatile memory.

In one method of managing data in a nonvolatile memory in which a host stores data, the host records allocation of stored data in a File Allocation Table that is also stored in the nonvolatile memory. When a request is received from the host for a portion of the File Allocation Table that is stored in the nonvolatile memory array, the portion of the File Allocation Table is read from the nonvolatile memory array. Subsequently, the portion of the File Allocation Table is modified according to a record that indicates at least one memory location used by the memory controller to store data received from the host and the modified portion of the File Allocation Table is sent to the host.

In another method, a cluster map is maintained in a volatile memory that indicates an allocation/deallocation state for each of a plurality of clusters. In response to receiving a host request for allocation information regarding the plurality of clusters, it is determined from the cluster map whether the plurality of clusters are allocated. If the plurality of clusters are not allocated, then allocation information is generated from the cluster map and is returned to the host. For example, a FAT sector may be generated showing no allocated clusters. This may be done without accessing the nonvolatile memory. If the cluster map indicates at least one allocated cluster, the allocation information may be read from the nonvolatile memory.

DETAILED DESCRIPTION OF ILLUSTRATED EMBODIMENTS

Certain embodiments described herein can be used to enable one-time or few-time programmable memories to work with existing consumer electronic devices (such as those that work with flash—an erasable, re-programmable non-volatile memory) without requiring a firmware upgrade, thereby providing backwards compatibility while minimizing user impact. As such, these embodiments are a viable way to bridge one-time or few-time programmable memories with existing consumer electronic devices that have flash card slots. These embodiments also allow future consumer electronic devices to be designed without updating firmware to include a file system customized for a one-time or few-time programmable memory. Certain embodiments described may also be applied to nonvolatile memories that are many-time programmable. It is not required that a memory be one-time programmable to employ the techniques described.

Figure 1:
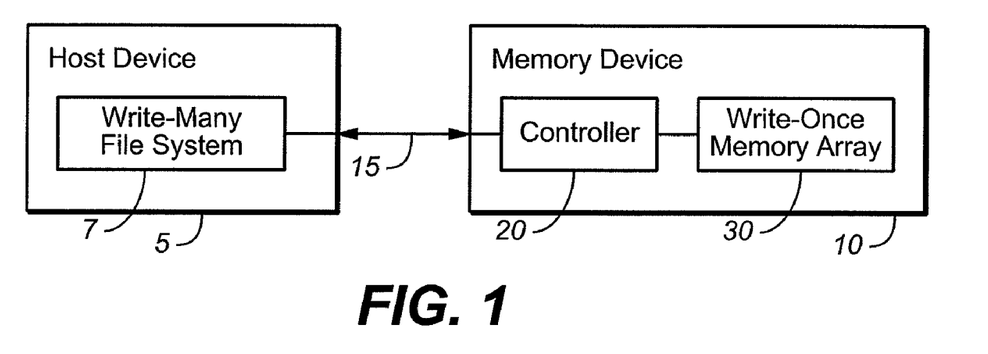
FIG. 1 shows a host device in communication with a memory device that includes a write-once memory array.

Turning now to the drawings, FIG. 1 is a block diagram of a host device 5 connected to a memory device 10. Both the host device 5 and the memory device 10 comprise electrical connectors that mate with one another to electrically couple the host device 5 with the memory device 10 through an interface 15. As used herein, the term "coupled with" means directly coupled with or indirectly coupled with through one or more intervening components. The host device 5 can take the form of a consumer electronic device such as, but not limited to, a digital still or moving camera, a personal digital assistant, a cellular phone, a digital audio player, or a personal computer (such as those with USB reader/writers or PCMCIA card adapters). In this embodiment, the host device 5 contains a write-many file system 7, such as the DOS-FAT file system. Other controllers are also described that are not "backwards compatible controllers," for example controllers used with erasable nonvolatile memory.

The memory device 10 can take the form of a modular, compact, handheld unit, such as a memory card or stick. The memory device 10 comprises a controller 20 and a write-once memory array 30. The interface 15 between host 5 and memory device 10 can be configured for MultiMedia, Secure Digital, Memory Stick, Compact Flash, Smart Media, xD, USB, HS-MMC, or any of the many portable storage media available. As described in detail below, controller 20 allows the memory device 10 to be backwards compatible with a host device using a write-many file system. As such, the controller 20 will sometimes be referred to herein as a "backwards compatible controller" or "BCC."

One implementation of the controller 20 is an ASIC using a finite state machine combined with standard combinatorial logic. However, the controller 20 can be implemented in a variety of other forms, such as, but not limited to, a microcontroller or a microprocessor with firmware. Additionally, while the controller 20 is separated from the memory array 30 in this embodiment, a controller and a memory array may be integrated into a single die to save cost. The design of the controller 20 in this embodiment is very similar to a controller used for rewritable memory technologies. Examples of differences are that this controller 20 does not need any wear leveling or other logic associated with erasing non-volatile memory. While the design presented here could include these additional blocks and function, they would probably not be cost optimal.

The write-once memory array 30 comprises a plurality of field-programmable write-once memory cells. Field-programmable write-once memory cells are memory cells that are fabricated in an initial, un-programmed digital state and can be switched to an alternative, programmed digital state at a time after fabrication. For example, the original, un-programmed digital state can be identified as the Logic 1 (or Logic 0) state, and the programmed digital state can be identified as the Logic 0 (or Logic 1) state. Because the memory cells are a write-once type, an original, un-programmed digital state of a storage location (e.g., the Logic 1 state) cannot be restored once switched to a programmed digital state (e.g., the Logic 0 state). Instead of being a one-time programmable (i.e., write-once) memory array, the memory array 30 can take the form of a few-time programmable (FTP) memory array, which is a memory array that can be written to more than once but not as many times as a write-many memory array. Also, the memory device 10 can contain additional memory arrays (write-once, few-time programmable, or write-many).

The write-once memory array 30 can take any suitable form, such as a solid-state memory device (i.e., a memory device that responds to electrical read and write signals), a magnetic storage device (such as a hard drive), or an optical storage device (such as a CD or DVD). When in the form of a solid-state memory unit, the memory cells in the memory array 30 can be organized in a two-dimensional or three-dimensional fashion. In one embodiment, the memory array 30 is a three-dimensional array, such as an array described in U.S. Pat. No. 6,034,882 to Johnson et al., and U.S. Pat. No. 5,835,396 to Zhang. In some other embodiments erasable nonvolatile memory such as erasable flash memory is used.

Figure 2:
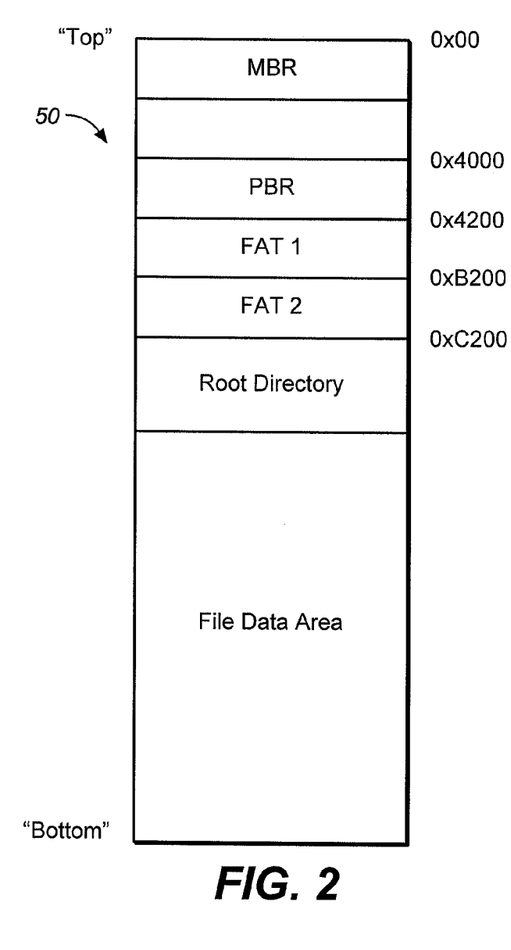
FIG. 2 shows a memory map of the write-once memory array.

To illustrate these embodiments, the DOS FAT file system (such as utilized in the Windows Operating System) will be used as an example of a write-many file system. It should be noted that these embodiments can be used with other types of write-many file systems. Turning again to the drawings, FIG. 2 is a memory map 50 of the logical address space of a typical FAT 12/16-based storage card showing various file system structures. As used herein, a "file system structure" refers to any data that describes a partition in memory, the memory space within the partition, and/or the type of commands that a file system can or cannot use with that partition. Examples of file system structures include, but are not limited to, master boot record, a partition boot record, a file allocation table ("FAT" or "FAT table"), a root directory, and a sub-directory. The master boot record (MBR) is used to store boot information for the card (i.e., the memory device 10) as well as the starting location of each logical partition. Most memory cards, such as the one shown here, only contain one logical partition. In this example, the partition boot record (PBR), which contains information such as cluster size, number of clusters, partition type, partition name, etc, starts at address 0x4000. FAT1 corresponds to FAT table one, which contains a linked list of clusters numbers for each file, directory, and other information on the card 10. FAT2 corresponds to FAT table two. Lastly, the root directory and file data area begin at physical address 0C200. This area is divided into clusters, corresponding to the cluster numbers in each FAT table. Note that this is only an example of a FAT File System and in no way intended to limit the invention. Different locations for each structure, different cluster sizes, and even different file systems can be associated with the embodiments described herewith. A FAT file system may be used with both logically-addressed and physically-addressed memories.

A logically-addressed memory maps data provided by the host to locations in memory and records the mapping. Addresses allocated to the data by the host are treated as logical addresses and these addresses are not tied to particular locations in the physical memory. One common method is to use a physical-to-logical-address table that is read or calculated at startup and then stored in volatile memory in the controller 20. In OTP memory, updated data is allocated by the host to clusters that were previously allocated to old data. Thus, the same logical address range is occupied, but additional space must be occupied in the physical memory. This discrepancy between the logical address range that is indicated to be available in the FAT and the physical address range that is actually available in the memory may cause problems. For example, the host may attempt to write to a full memory.

In a physically-addressed memory, data from the host is stored according to the address provided by the host. Thus, the address provided by the host is treated as a physical address, not just a logical address and no physical-to-logical address translation table is needed. However, there may be some exceptions in such a system, where data is not stored at the address provided by the host. Some scheme is generally needed to track such data. One scheme is to use the "sideband area" (or "overhead area") of a memory page that is not visible to hosts. An example of such a scheme is given in US Patent Application Publication No. 2006/0047920. In one embodiment, the memory array is organized in 528 Byte pages that each store one sector, but the host sends data in a 512 Byte sector, leaving 16 Bytes of extra space. These extra 16 Bytes are referred to as the sideband and can be used by the controller to store extra information including, but not limited to, ECC data, data and address validity flags, and remapping pointers. In this scheme, the controller 20 uses part of this sideband to store a physical address if the page has been remapped. If the page is written for the first time, no remap pointer will be needed, as the physical and logical address will be the same. When the host 5 attempts to modify the data, the controller will write the new data to a new location and store the physical address of this location into the sideband of the old location.

In general, a host does not know whether a memory system is logically addressed or physically-addressed and the embodiments described here may apply to either physically-addressed or logically-addressed memories. The description refers to logically-addressed memory, but it will be understood that a physically-addressed memory may generally be treated as a logically-addressed memory with a particular predetermined logical-to-physical mapping. In either logically-addressed or physically-addressed systems, if a host updates or deallocates data in an OTP memory, the host may see more space available in the memory (through FAT) than is actually available in the physical memory.

One simple way to solve the problem of accounting for controller usage of physical memory is to reserve memory space for controller use before the time of sale of the memory device 10. Such space is not made available to the host. This static amount of memory space can be used by the controller 20 until there is no more reserved space left. At this time, the controller 20 can signal a card error, allow any write that is not a remap, or many other operations. One can see that this method, referred to as static allocation, may be undesirable, as it limits the number and size of operations that a user can perform.

Figure 3:
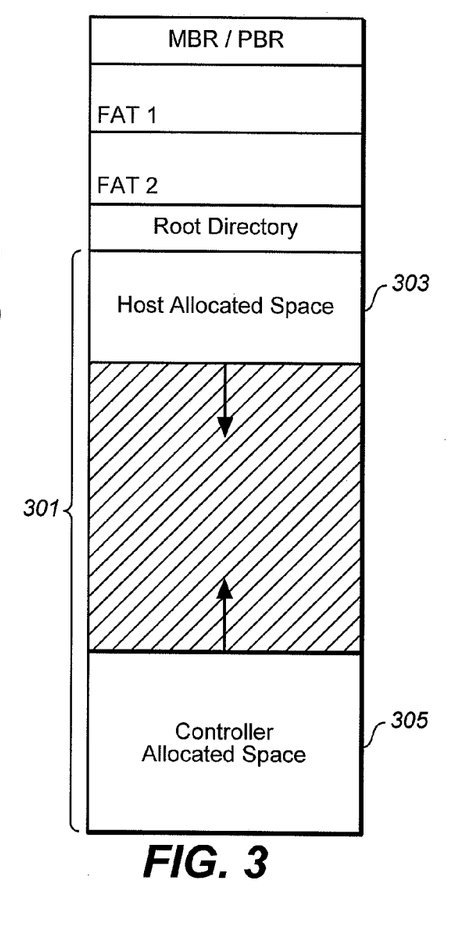
FIG. 3 shows a memory map including usage of space within the write-once memory array where clusters are allocated by the host from one end and clusters are allocated by the controller from the other end of the address range.

In an alternative dynamic allocation scheme shown in FIG. 3, the host and controller both allocate clusters from the same logical address space 301. In one example, a host allocates clusters from the top of the available address space 301, while the controller allocates clusters from the bottom of the available address space as shown in FIG. 3. Thus, the host allocates space 303 for new data, while the controller allocates space 305 for updated data. In this way, there is no predetermined limit on the division of available space between host allocated space and controller allocated space. However, the usage of space by the controller must be reported to the host in some manner.

In one scheme, the space used by the controller is communicated to the host through FAT information sent to the host. In this way, as the available physical space in the memory diminishes, the logical space available to the host as shown in the FAT also diminishes.

Figure 4A:
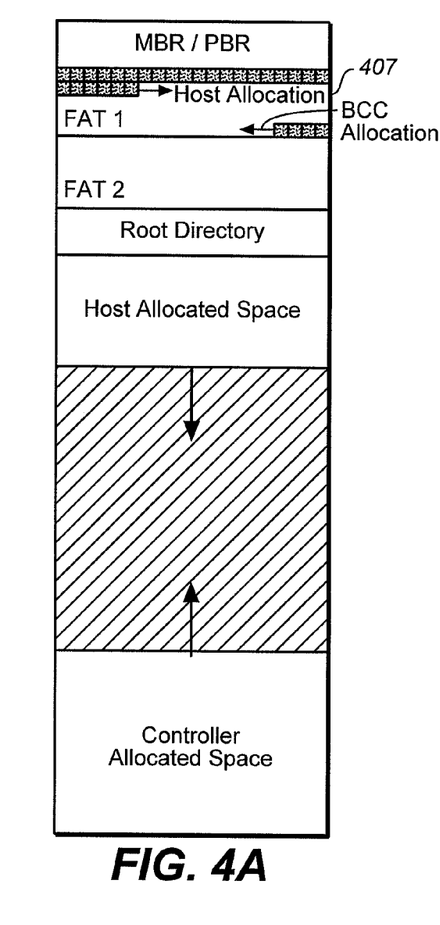
FIG. 4A shows a memory map of the logical address space of a write-once memory, including a File Allocation Table (FAT) that reflects both allocation by the host and allocation by the controller.

In the example of FIG. 4A, the controller 20 informs the host 5 that space has been used for remapping by writing to the FAT table 407 stored in the nonvolatile memory. Examples of memory systems using a system such as this are provided in U.S. Patent Application Publication No. 2006/0047920. As additional memory is needed, the controller 20 can allocate a new cluster for its own use just as the host 5 would allocate a cluster for file data. That is, this scheme dynamically updates the FAT table 407 as additional space is needed for remapping. The benefit of this implementation is that the host 5 and user are not limited in the number of remaps/file modifications they can perform. The controller 20 will allow them to remap until the card is completely full. In this embodiment, the controller 20 allocates memory from the bottom up, as most hosts allocate memory from the top down (from the beginning of logical space, as shown in FIG. 2). This allocation scheme will allow the controller 20 and host 5 to independently allocate memory. This also allows the controller 20 to acknowledge that the card 10 is full whenever the two allocation zones collide. At the time the card is fall, the controller 20 may choose to set its permanent and temporary write protect registers, signaling to the host 5 that no more writes to the card 10 are possible. Alternatively, a controller may use some other system to prevent additional writes when the card is full. Generally, the host will not try to write to a full card because the FAT indicates that the logical address space is full (if the host caches FAT data, the cached FAT may not show a full logical address space). A non-cached system will know how much memory is left, while a cached system will read the FAT table at startup to see how much remap space was used prior to that particular session.

Figure 4B:
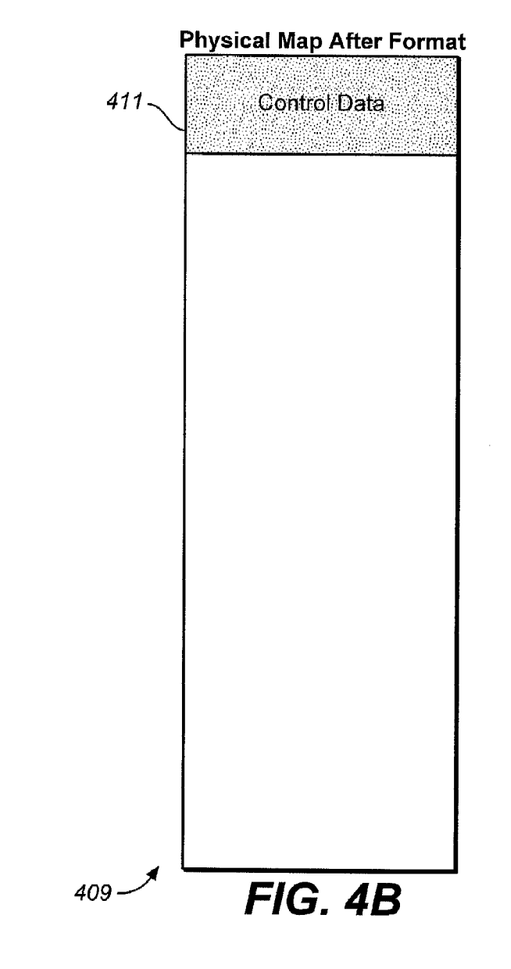
FIG. 4B shows a map of the physical address space of the memory of FIG. 4A prior to storing host data.
Figure 4C:
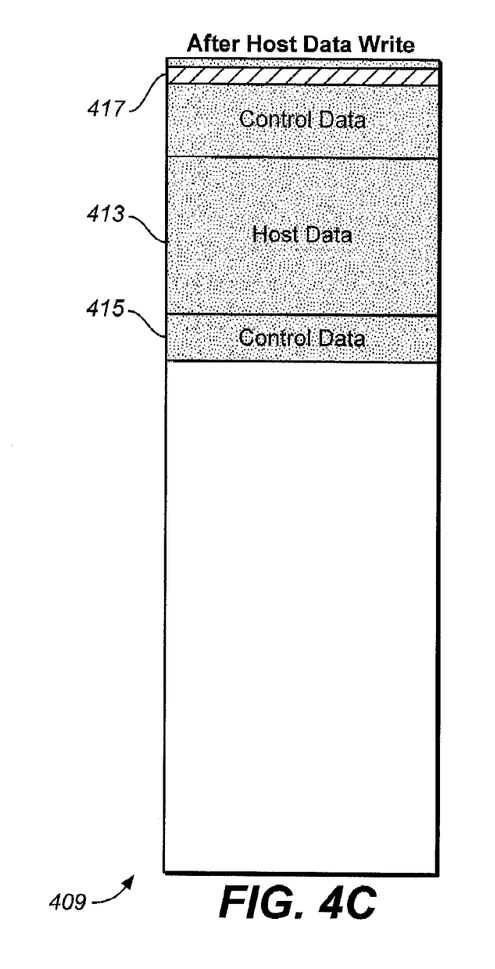
FIG. 4C shows a map of the physical address space of the memory of FIG. 4B after host data is stored and control data is updated to reflect the stored host data.
Figure 4D:
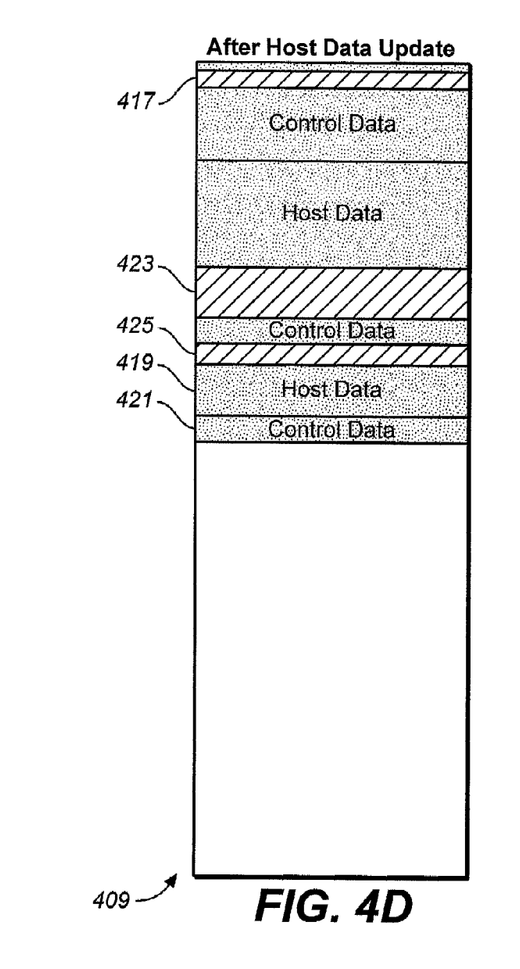
FIG. 4D shows a map of the physical address space of the memory of FIG. 4C after an update to the host data is received and stored, updated control data also being stored.

In a logically-addressed memory, use of physical memory space does not have to follow the same pattern as followed for use of logical space. FIGS. 4B-4D illustrate how physical memory space is used for storage of data as the controller and host store data and allocate logical address space as shown in FIG. 4A.

FIG. 4B shows the physical memory 409 an initial state where a portion 411 of the physical memory is used to store control data and the rest of physical memory 409 is unprogrammed. Control data may include data generated by the controller that is used for managing data in the memory array, for example data used by the controller for logical-physical mapping. Generally, such control data is not visible to the host. Data supplied by the host, including MBR and FAT are considered host data in this example. Control data is generated during an initial formatting operation in this example.

FIG. 4C shows the physical memory after the host sends host data to be stored in physical memory 409 for the first time. The host data is written to the next available physical location 413 after the control data. After the host data is written, at least a portion of the control data must be updated to reflect the newly written host data. This updated control data is written to the next physical location 415 available after the host data. As a result of this updated control data, a portion 417 of the previously stored control data is obsolete.

FIG. 4D shows the physical memory 409 after the host sends updated data to replace a portion of the previously programmed host data. For example, the host may send a number of sectors of host data with the same logical addresses as previously stored sectors. The updated host data is stored in the next available physical location 419. Control data related to the updated host data is then stored in the next available physical location 421. Updated host data makes a portion 423 of the original host data obsolete. Updated control data makes a portion 425 of the first updated control data obsolete. Thus, portions of the physical memory space are occupied by obsolete data portions 417, 423, 425, which include obsolete host data and obsolete control data. The controller may allocate logical space to account for this loss of physical space to obsolete host data and control data.

It should be noted that static and dynamic remapping are not mutually exclusive. One may choose to implement both in a single product. For example, a user may want to delete or modify files even though the card is full, and no additional files can be added. Additional data modification can be allowed if a set amount of memory is pre-allocated and not used under normal operation. For example, the card 10 can have 500 KB of static remap set aside that the controller 20 does not use until the card 10 appears full due to host and controller allocation collisions. At this time, the controller 20 can allow the host's additional data to be written to the static allocation zone until the desired operation is complete. Later, smart filters can be used to allow some user operations such as delete and renames to occur in the static area, while other operations would result in an error, as the card 10 is essentially full for most use.

Figure 5:
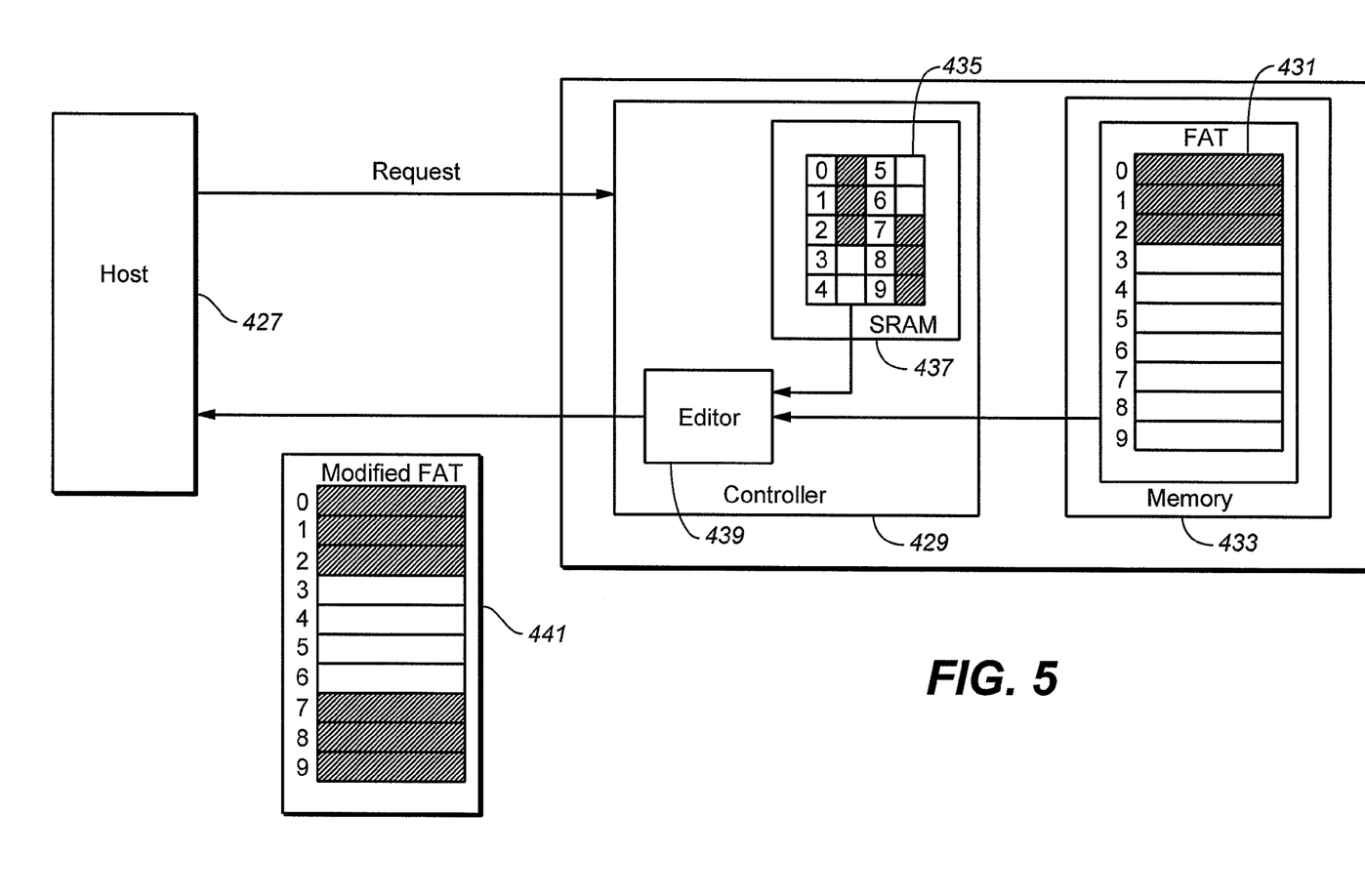
FIG. 5 shows an alternative embodiment where a FAT stored in nonvolatile memory reflects allocation by the host and a record stored in volatile memory reflects allocation that is not by the controller, the information from the FAT and the record being combined in response to a host request for FAT information.

FIG. 5 shows an alternative scheme to that of FIG. 4. In the scheme shown in FIG. 5, the host 427 allocates clusters from the top and the controller 429 allocates clusters from the bottom as before. However, in this case, only the allocation of clusters by the host 427 is recorded in the FAT 431 stored in the nonvolatile memory 433. Thus, the copy of FAT 431 stored in nonvolatile memory 433 shows clusters 0-2 being allocated and shows clusters 3-9 being available for storage of additional data. Allocation of clusters 7-9 by the controller 429 is not recorded in FAT 431 but is recorded in a record 435 that is stored within a volatile memory 437. In this case the volatile memory 437 is a Static Random Access Memory (SRAM) in a controller 429, though other volatile memories may also be used. In this case, the record shows both clusters allocated by the host and clusters allocated by the controller. The record in this example records only a cluster's state as allocated or deallocated. No additional information is stored in the record. In contrast, the FAT records not only whether a cluster is allocated but also provides additional information such as the next cluster in a chain or an end-of-file indicator. The record 435 may have a single bit (indicating allocation/deallocation) for each cluster and may be considered a bitmap or a cluster map.

When the host 427 requests FAT information (generally by sending a read request for one or more FAT sectors), controller 429 provides FAT information that reflects both the FAT information stored in FAT 431 in the memory 433 and the allocation information stored in record 435 in volatile memory 437. The requested portion of FAT information is read from the nonvolatile memory 433 and sent to an editor 439 in the controller 429. The record 435 is also read from volatile memory 437 and is used by the editor 439 to edit or modify the FAT information from the nonvolatile memory 433. The editor 439 makes changes to the FAT information to reflect allocation by the controller 429 in addition to the allocation by the host 427 that is already recorded in FAT 431. The allocation by the controller 429 may be indicated by marking allocated clusters in any suitable manner that is compatible with the FAT scheme of the host 427. For example, the clusters may be marked as bad clusters, reserved clusters or used clusters. The modified FAT information 441 is then sent to the host 427. In this way, the host 427 is informed of unavailable space in the nonvolatile memory that is unavailable as a result of remap operations by the controller 429. This prevents the host 427 from attempting to allocate clusters that are already used by the controller 429. In one embodiment, clusters allocated by the controller are shown as being allocated to a file created by the controller. The file may have a filename such as "unused capacity," to indicate that it is not a host file. Such a file is shown by a directory entry that is provided when the host requests directory information stored in the memory. The directory entry may be added to a directory stored in memory in a similar manner to modification of FAT information. This allows a user to see how much capacity is unused due to controller operations. In particular, this allows a user to account for any apparent discrepancy between the stated capacity of a memory card and the amount of user data stored before a card-full condition is reached. The editor may be formed as a dedicated circuit in the controller or may be implemented through firmware or some combination of hardware and firmware.

A record may initially be generated when the memory system is first turned on. A controller may scan the memory to build the initial record. Clusters allocated by the host may be detected simply by reading the FAT. Clusters allocated by the controller may be obtained by scanning the memory itself or by scanning management structures that indicate usage of memory. As the controller carries out remap operations, additional clusters are used by the controller and this use is reflected in the record. Initially, the controller may use some space that is dedicated for the controller. Later, when such dedicated space is all used, the controller may start to use the logical space that is also used by the host and so, the controller also starts to record the use of this space in the record. The controller generally starts using logical space that is available to the host when the amount of obsolete data reaches a limit. This limit is determined by the amount of spare physical capacity available. In one example the limit is the total physical capacity of the memory, minus the logical capacity of the memory (as seen by the host), minus some minimum space required for control data and some operational space. In some cases, the controller may indicate use of logical space in a record before a corresponding portion of the physical memory is used. For example, where a controller has scheduled some operation that will require some space in physical memory, the controller may reserve this space, making it unavailable to the host, by indicating that it is unavailable in the record. Allocation by the host may also be reflected in the record, but this is not necessary because allocation by the controller is recorded in the FAT. The number of writes to the nonvolatile memory is reduced in this example compared to the example where both host and controller allocation is recorded in the FAT. Because there are fewer FAT writes to the nonvolatile memory, less space is needed for storing the FAT.

Figure 6:
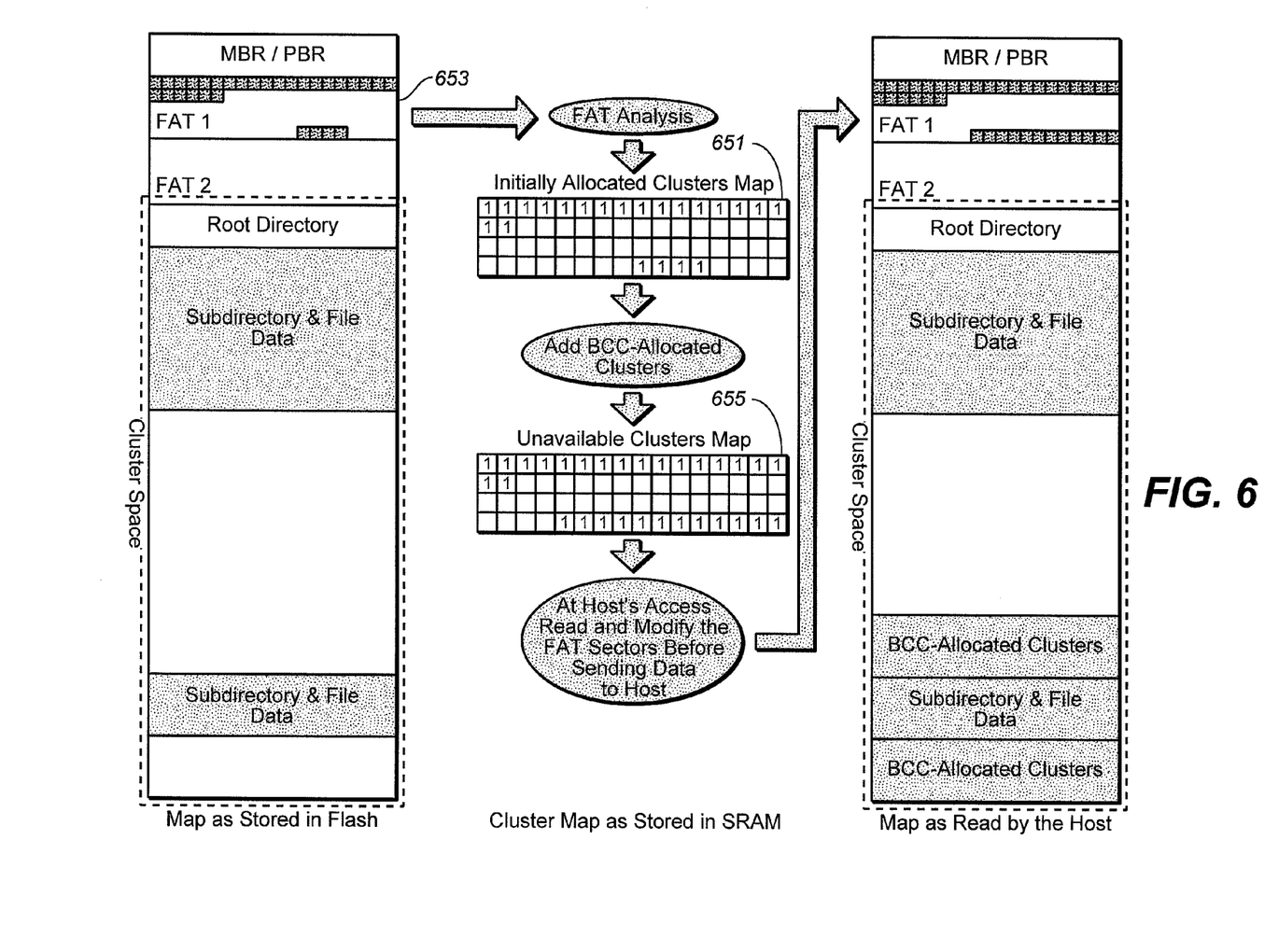
FIG. 6 shows an embodiment where a host allocates space in a memory non-sequentially and a controller allocates space in a manner that adapts to the host allocated space.

FIG. 6 shows an example where a host does not allocate clusters sequentially. In general, a host allocates clusters in sequential order in an unwritten memory. However, this is not always the case. Where a host allocates clusters nonsequentially, it is generally preferable that a card-full condition is not generated when host allocated clusters and controller allocated clusters meet. In the present example, an initially allocated cluster map 651 is obtained from the FAT 653 stored in the memory (other sources may also be used to generate the cluster map). This map 651 indicates clusters allocated by the host nonsequentially. The initially allocated cluster map 651 is then modified to reflect clusters allocated by the controller to provide a complete cluster map 655. The controller allocated clusters extend from the bottom of the address range to an area of host allocated clusters and also extend above this area of host allocated clusters. Thus, in this scheme, a memory-full condition is not generated when host allocated clusters and controller allocated clusters meet. Instead, the controller seeks the next available cluster for a remap operation. A memory-full condition may occur only when some other condition is met, such as all clusters in the address range being allocated. Whenever the host requests FAT information, the FAT information is read from the nonvolatile memory and modified before being sent to the host. FIG. 6 shows a first map 651 of cluster allocation as it is indicated by the FAT 653 stored in the nonvolatile memory. FIG. 6 shows a second map 655 of cluster allocation as it is indicated to the host. The second map includes clusters allocated by the controller as well as clusters allocated by the host. In this scheme, it is not necessary that the controller allocate clusters sequentially from one end of the address range. A different scheme may be used that mixes host allocated clusters and controller allocated clusters.

Figure 7:
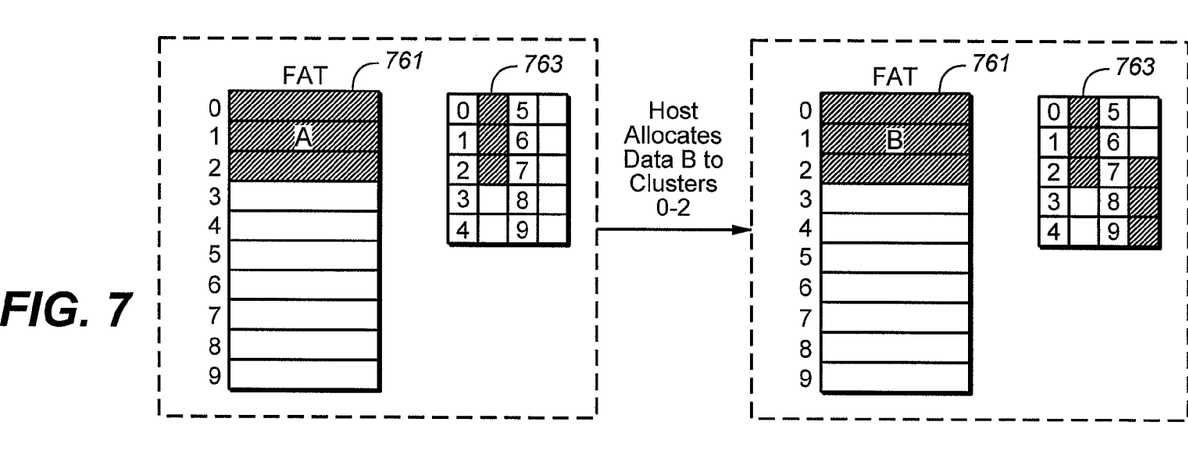
FIG. 7 shows an embodiment where a host allocates updated data that is reflected in a record in nonvolatile memory.

FIG. 7 shows a first example of a host operation that results in a change in a record. Prior to the host operation, the FAT 761 shows clusters 0-2 occupied by data A. Both the FAT 761 and the record 763 of FIG. 7 show use of logical space, not physical space. The record 763 also shows clusters 0-2 as allocated. No other clusters are shown as allocated at this point. The host then allocates data B to clusters 0-2. Data B is written to the physical memory at a new location that is recorded in a physical-to-logical address translation table. The FAT 761 is updated to show data B allocated to clusters 0-2. Thus, the allocated space indicated by the FAT 761 is the same as before. However, there is more space used in the physical memory because data B was written to a new location and data A still occupies another location. To indicate this usage, the record 763 is updated to show use of clusters 7-9. Thus, the record indicates use of six clusters, which corresponds to the amount of physical memory used. If the host requested FAT information for clusters 0-9 at this point, the FAT information returned to the host would indicate that clusters 0-2 and 7-9 are unavailable.

Figure 8:
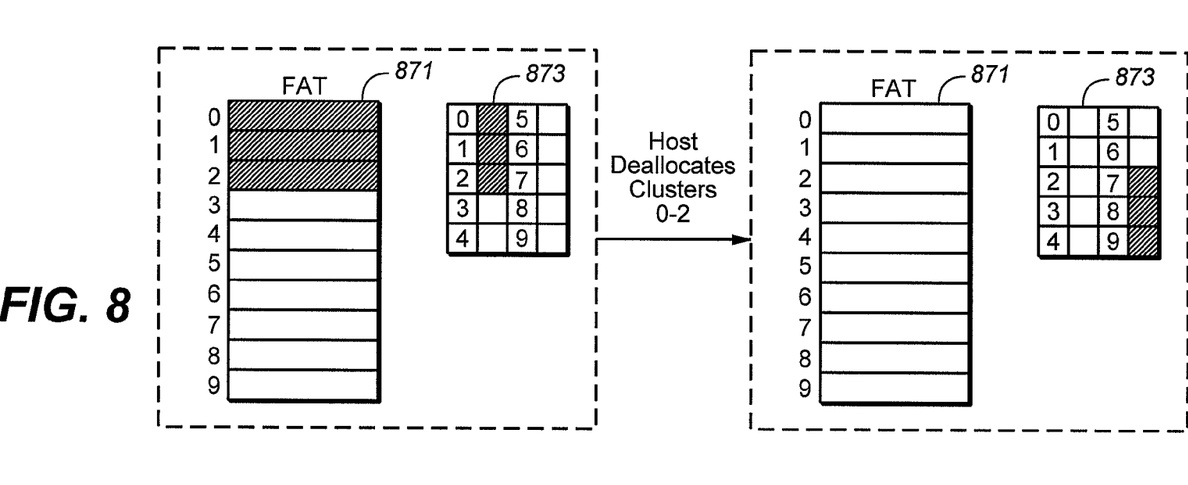
FIG. 8 shows an example where a host deallocates a number of clusters, and the record is updated to indicate use of an equal number of clusters.

FIG. 8 shows a second example of a host operation that results in a change in a record. Prior to this host operation, the FAT 871 shows clusters 0-2 occupied by data. The record 873 also shows these clusters as allocated. The host then deallocates clusters 0-2. For example, the host may attempt to delete data that occupies clusters 0-2, for example by marking clusters 0-2 as available and by removing the file that is allocated to clusters 0-2 from the directory (in the case where a file is shortened, clusters may be marked as unavailable, and the directory entry is updated with the new length). This makes clusters 0-2 available for storage of additional data in the FAT 871. However, no more space is made available in the physical memory by the host's operation. In order to reflect the space used in the physical memory, the record is updated to show clusters 7-9 as used. If the host requested FAT information for clusters 0-9 at this point, clusters 7-9 would be shown as unavailable. In an alternative example, the record indicates clusters 0-2 are allocated, even after clusters 0-2 are deallocated by the host and recorded as deallocated in FAT. Subsequently, when the host requests FAT information for clusters 0-2, they are indicated to be allocated. In some cases this may cause problems because the host may have a separate record (such as a cached portion of FAT) that indicates clusters 0-2 are deallocated.

The above examples refer to controller use of memory space for storage of host data. However, in other cases the controller may use memory space for other purposes and account for the used space in memory using a record as described. Either erasable or OTP memory may be used. In one example, an embedded application running in a memory card may use space in the nonvolatile memory. Use of space in a nonvolatile memory by such an application may be tracked and communicated to the host through a cluster map in volatile memory.

In another embodiment, a cluster map in volatile memory may be used to reflect allocation by a host that operates according to a different interface. U.S. patent application Ser. No. 11/196,869 discloses memory systems where two host interfaces share the same physical area in memory. A first host maintains a FAT indicating its use of logical address space, while a second host uses a different management system that does not require FAT. However, the FAT is modified to show use of logical space in the FAT by the second host corresponding to the space that the second host uses to store data in the physical memory. In an alternative arrangement, instead of modifying the FAT to reflect activity by the second host, a cluster map or similar record may be maintained that shows such use. When the first host requests FAT information, the FAT may be read and modified according to the record to reflect use of memory by both the first and second hosts.

Figure 9:
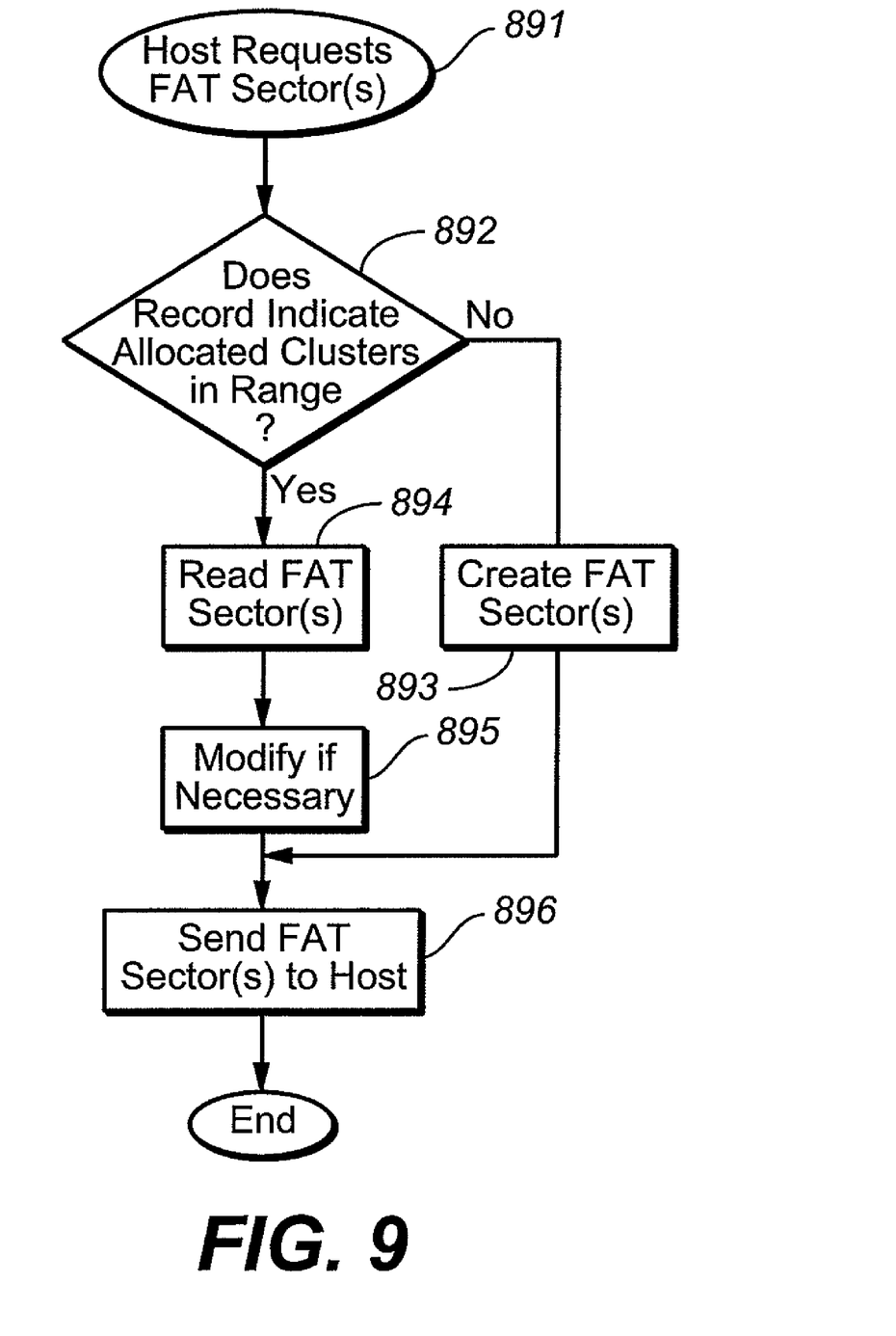
FIG. 9 shows a flowchart of a technique for using a record in volatile memory to reduce the number of reads of nonvolatile memory.

In one example, shown in FIG. 9, a record maintained in volatile memory may be used to reduce the number of reads of FAT stored in nonvolatile memory. When a host requests one or more FAT sectors 891 for a particular logical address range, the memory controller may examine the record for that range to determine 892 if any clusters in the range are allocated. If there are no allocated clusters in the range, then the controller can generate FAT information to reflect this, by creating one or more FAT sectors 893. Thus, no access to the nonvolatile memory is necessary. If clusters in the requested address range are indicated by the record to be allocated, then the FAT stored in nonvolatile memory is generally read 894 to obtain full FAT information. The FAT read from the nonvolatile memory may be modified 895 according to the record before being sent to the host 896.

The record of cluster allocation by the controller may be maintained as a file. In the examples described above, this file is maintained in volatile memory only and is not stored in the nonvolatile memory. However, in some cases, such a file may be separately stored in nonvolatile memory as part of a power-down routine or otherwise. This may reduce the time needed to generate a record in volatile memory when the memory system is initially powered-on.

In one embodiment, clusters allocated by the host and clusters allocated by the controller are distinguished during failure analysis by comparing the allocation indicated by the FAT with actual memory use.

Memory space is allocated in units of a cluster. Cluster size generally depends on the memory system used and may vary from one memory system to another. In one example, a cluster consists of 32 sectors of data. Where the nonvolatile memory is erasable, the size of a block (the minimum unit of erase) may also be 32 sectors. In other examples, a block may contain two or more clusters.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

Although the various aspects of the present invention have been described with respect to certain preferred embodiments, it is understood that the invention is entitled to protection within the full scope of the appended claims.

What is claimed is:

1. A method of managing data in a nonvolatile memory array in which a host stores data, the host recording addresses of stored data in a File Allocation Table that is also stored in the nonvolatile memory array, comprising:

receiving a request from the host for a portion of the File Allocation Table that is stored in the nonvolatile memory array;

reading the portion of the File Allocation Table from the nonvolatile memory array;

subsequently modifying the portion of the File Allocation Table according to a record that indicates at least one address used by a memory controller to store data received from the host;

sending the modified portion of the File Allocation Table to the host; and wherein the record is maintained in a volatile memory and is not maintained in the nonvolatile memory array.

2. The method of claim 1 wherein the nonvolatile memory array is not erasable.

3. The method of claim 1 wherein the record is a cluster map that includes an allocation/deallocation state for each of a plurality of clusters.

4. The method of claim 3 wherein the use of the address by the memory controller occurs in response to the host allocating data to a previously allocated cluster.

5. The method of claim 3 wherein the use of the address by the memory controller occurs in response to the host deallocating previously allocated clusters.

6. A method of managing data in a nonvolatile memory array comprising:
   receiving a first portion of data from a host, the first portion of data allocated by the host to a first cluster that was previously allocated;
   storing the first portion of data in the nonvolatile memory array;
   receiving allocation information from the host, the allocation information linking the first portion of data and the first cluster, the allocation information indicating that a second cluster is available for storage of additional data;
   storing the allocation information in the nonvolatile memory array;
   subsequently, in response to a host request for the allocation information, reading the allocation information that indicates that the second cluster is available for storage of additional data from the nonvolatile memory array and subsequently modifying the allocation information according to a record, the modified allocation information indicating that the first cluster and the second cluster are both unavailable for storage of additional data;
   subsequently sending the modified allocation information to the host in response to the host request; and
   wherein the record is maintained in a volatile memory and is not maintained in the nonvolatile memory array.

7. A method of managing data in a nonvolatile memory in which a host allocates data in clusters and records the allocation in the nonvolatile memory, comprising:
   generating a cluster map that indicates an allocation/deallocation state for each cluster of a plurality of clusters;
   maintaining the cluster map in a volatile memory and not in the nonvolatile memory;
   in response to receiving a host request for allocation information regarding the plurality of clusters, determining from the cluster map whether the plurality of clusters are allocated; and
   if the plurality of clusters are not allocated, then generating allocation information from the cluster map and returning the generated allocation information to the host.

8. The method of claim 7 further comprising, if at least one of the plurality of clusters is allocated, then reading the allocation information from the nonvolatile memory.

9. The method of claim 8 further comprising modifying the read allocation according to the record and providing the modified allocation information to the host.

10. The method of claim 9 wherein the modified allocation information shows a file allocated to the at least one of the plurality of clusters.

11. A method of managing data in a nonvolatile memory system having a logical address space that is allocated to data stored in the nonvolatile memory, comprising:
   recording allocation of address space by a host in a file system structure that is stored in the nonvolatile memory array;
   recording allocation of address space that is not by the host in a record that is stored in a volatile memory array and is not stored in the nonvolatile memory array; and
   in response to a host request for allocation data, consulting the record and providing a response to the host that is dependent on the contents of the record.

12. The method of claim 11 wherein the allocation of address space that is not by the host is allocation of address space for updating control data by a memory controller.

13. The method of claim 11 wherein the allocation of address space that is not by the host is allocation of address space by another host that does not record its allocation in the file system structure.

14. The method of claim 11 wherein the allocation of address space that is not by the host is allocation of address space by an embedded application within the nonvolatile memory system.

15. The method of claim 11 wherein the response includes an indication that a specific file is allocated to address space that is indicated by the record to be allocated.

* * * * *